Aug. 31, 1965
G. O. TURLEY
3,203,491
FISHING TOOL WITH MAGNET AND FLUID PORTS
Filed Feb. 28, 1963
2 Sheets-Sheet 1
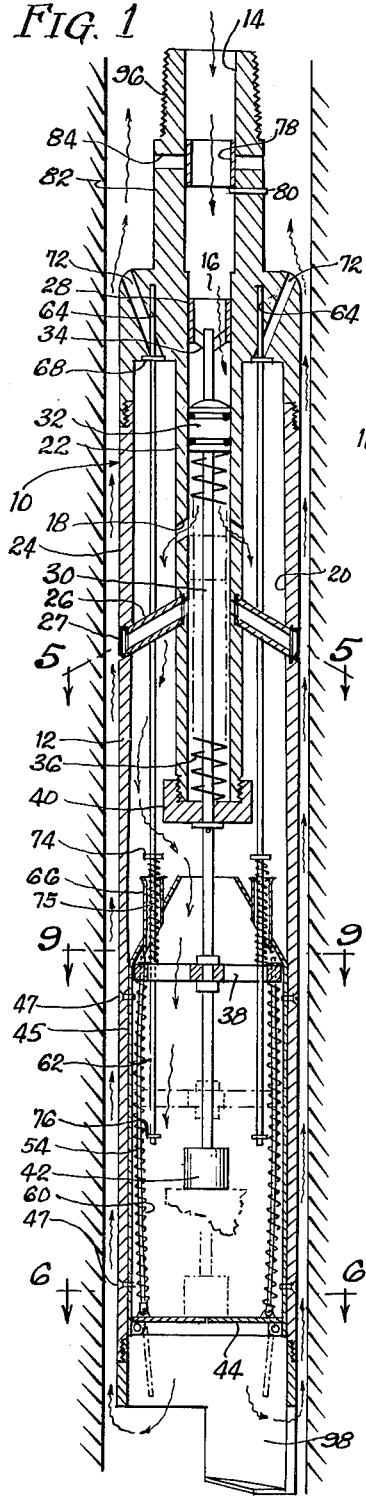
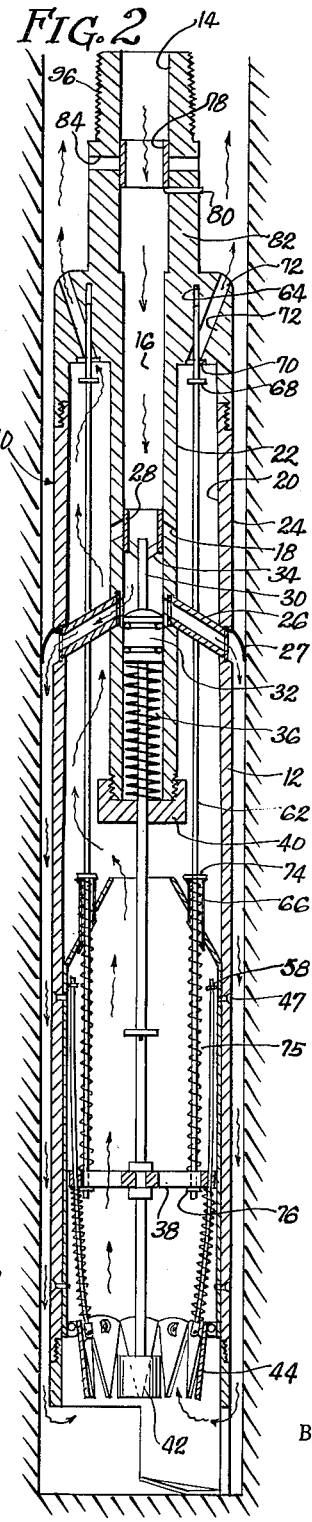
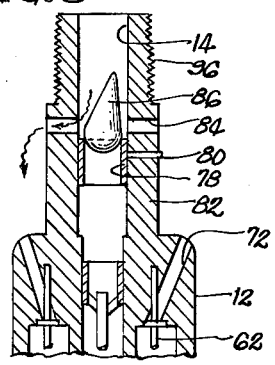
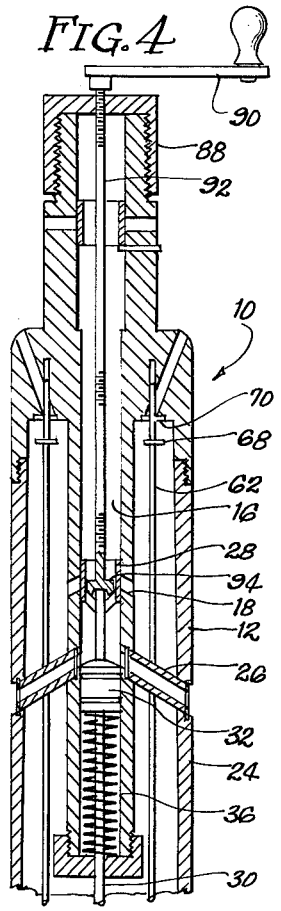
INVENTOR.
Gerald O. Turley
BY Dons McDougall
and Hersh
Att'ys

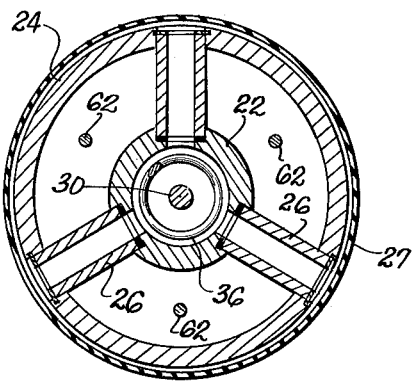
FIG. 5
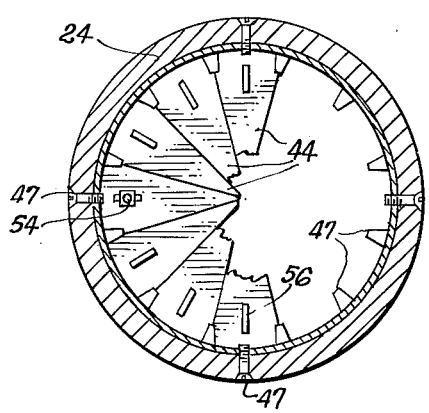
FIG. 6
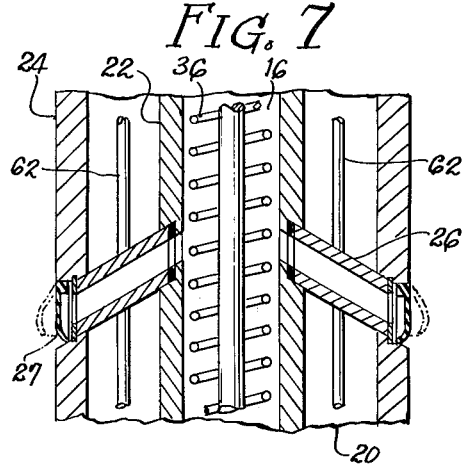
FIG. 7
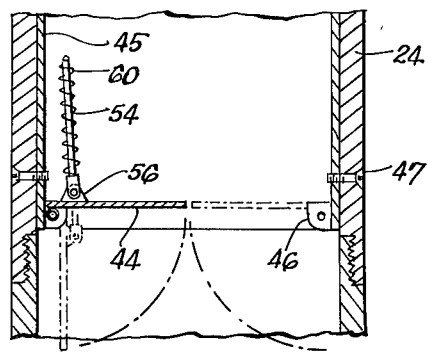
FIG. 8
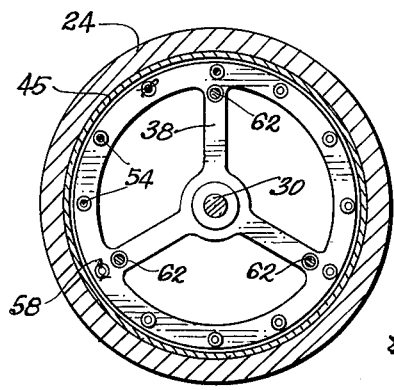
FIG. 9
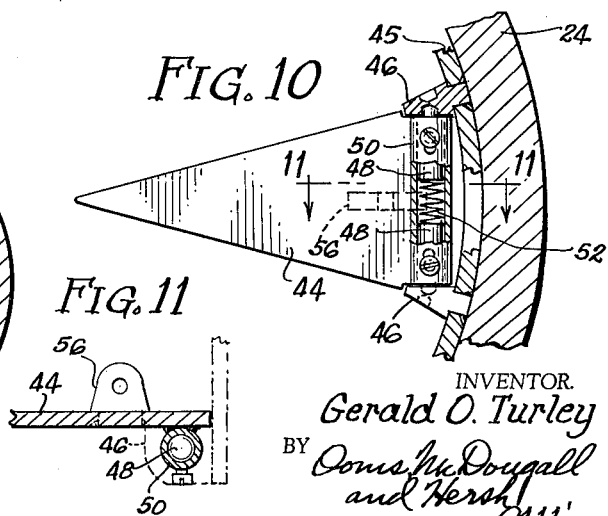
FIG. 10
FIG. 11
INVENTOR.
Gerald O. Turley United States Patent Office 3,203,491
Patented Aug. 31, 1965

3,203,491
FISHING TOOL WITH MAGNET AND
FLUID PORTS
Gerald O. Turley, Box 166, Musselshell, Mont.
Filed Feb. 28, 1963, Ser. No. 261,595
17 Claims. (Cl. 175—235)

This invention relates to a fishing tool of a type which can be used in conjunction with the drilling of wells.

In the production and recovery of oil, gas, and the like, and for many other reasons, well holes are formed into the earth. In many instances, such wells are driven to depths of several thousand feet and the drill bits and other tools employed in the formation of these wells are necessarily subjected to a great deal of vibration and stress. In many instances, the various parts and elements employed in well formations become loosened and drop into the well bore. Moreover, in many instances, pieces of pipe and other structures have been known to disintegrate or break off, and various tools can accumulate in the well hole if they are accidentally dropped.

The accumulation of bits of metal or other foreign materials in the well hole presents an undesirable condition since these materials can be quite harmful to the drilling operation, for example in cases where a diamond bit is employed. Accordingly, it is essential that these materials be removed and various constructions have been proposed to accomplish this end. It has been found, however, that the available constructions for these purposes have been unsuitable for any one of several reasons. Thus, many structures provide magnetic means for picking up foreign materials, however, these means are ineffective where all or a portion of the foreign materials are non-magnetic. In other instances, baskets have been proposed for picking up underisarble materials at the bottom of a well bore, however, these means have proven ineffective since they are generally incapable of providing for complete cleaning of the well bore.

It is an object of this invention to provide a unique fishing tool for use in well drilling operations and the like which is characterized by extremely efficient operation.

It is a further object of this invention to provide a fishing tool of the type described which is uniquely suited for retrieving broken and disintegrated tool parts and other foreign materials at the bottom of a well bore.

It is a more particular object of this invention to provide a fishing tool of the type described which includes magnetic means for aiding in the retrieving of articles from a well bore and which also includes a novel enclosure within its confines for cooperating with the magnetic means whereby complete removal of foreign materials from a well bore can be accomplished.

It is a still further object of this invention to provide a fishing tool of the type described which is characterized by a unique fluid action whereby the tool can be utilized as a drilling means for cleaning a well bore, and whereby the fluid circulation can be transferred from a drilling circulation to a flushing circulation in order to provide for entrapment of the foreign material by the tool enclosure.

These and other objects of this invention will appear hereinafter and for purposes of illustration but not of limitation, specific embodiments of this invention are shown in the accompanying drawings in which:

FIGURE 1 is a sectional elevation of the fishing tool of this invention as it appears when disposed in a well bore;

FIGURE 2 is a sectional elevation of the fishing tool shown in FIGURE 1 with the parts thereof positioned to achieve a flushing action;

FIGURE 3 is a fragmentary sectional elevation illustrating the structure which permits passage of water around the tool during withdrawal from a well bore;

FIGURE 4 is a fragmentary sectional elevation illustrating means suitable for use during servicing of said tool;

FIGURE 5 is a cross-sectional view of the fishing tool taken about the line 5—5 of FIGURE 1;

FIGURE 6 is a cross-sectional view taken about the line 6—6 of FIGURE 1;

FIGURE 7 is an enlarged sectional elevation illustrating passage outlet means and flexible closures therefor;

FIGURE 8 is an enlarged sectional elevation illustrating the trap means employed for the structure of this invention;

FIGURE 9 is a cross-sectional view taken about line 9—9 of FIGURE 1;

FIGURE 10 is an enlarged detail view of one of the elements forming said trap means and also illustrating the mounting structure for this element; and, FIGURE 11 is a detail sectional view taken about the line 11—11 of FIGURE 10.

The mechanism of this invention generally relates to a retrieving apparatus which includes a body portion adapted to fit within a well bore and to be lowered into place near the bottom of the well. The design of this body portion is such that a first passage is provided within its confines and a second passage is also provided with ports being included for providing communication between these passages. A movable member is disposed within the first passage and a magnet or other retrieving means is connected to this movable member. When the movable member is in a first position, it is adapted to close off communication between the first passage and the exterior of the body portion. At the same time, this first position of the movable means permits communication between the first and second passages.

In a second position, the movable means is adapted to provide for communication between the first passage and the exterior of the body portion while closing off the ports which provide communication between the first and second passages.

The body portion of the tool is adapted to be connected to a source of fluid which is adapted to enter into the first passage. When this fluid enters while the movable means is situated in its first position, a drilling circulation for the tool is provided. Specifically, the fluid is adapted to pass from the first passage into the second passage down through the bottom of the tool and then upwardly around the exterior of the tool.

When the fluid enters while the movable means is in a second position, a flushing circulation for the tool is provided. This circulation results from the passage of fluid through said first passage and then outwardly and downwardly around the exterior of the body portion. From this point, the fluid circulates upwardly through the tool without interference from the fluid being introduced into the tool.

The tool is preferably provided with a drilling means at its lower end whereby bridges and the like in the well bore can be removed during lowering of the tool into the well. During this phase of the operation, the drilling circulation is advantageously provided.

The fishing tool of this invention is also provided with trap means adapted to cooperate with the magnet means for retrieving articles while flushing circulation is being carried out. The magnet means and trap means are preferably moved into a retrieving position through operation of the aforementioned movable means whereby the retrieving condition of the tool will take place automatically when the flushing circulation is effected. Furthermore, the magnet and trap means are adapted to be moved to a retaining position when the flushing circulation is terminated so that all foreign material retrieved will be automatically secured within the enclosure defined by the fishing tool.

In accordance with the preferred form of this invention, the movable means includes a piston adapted to operate in response to introduction of fluid through the entry end of the tool. Specifically, this piston means is adapted to be moved to its first position when fluid under a given pressure is introduced into the device. Since this first position of the movable means is adapted to provide for drilling circulation, a fluid pressure ideal for drilling, for example about 500 pounds of pressure, is utilized.

When it is desired to discontinue drilling and to accomplish retrieving by the tool, the fluid pressure is adapted to be increased and the piston thereby moved to its second position. The tool is to be designed whereby a desirable pressure, for example about 800 pounds of pressure, for providing flushing circulation will result in movement of the piston to its second position.

The accompanying drawings illustrate a fishing tool 10 adapted to accomplish the above mentioned objectives and characterized by the above noted distinctive features. The specific example of a fishing tool illustrated will also serve as a disclosure of the various other novel features of this invention.

The fishing tool includes a body portion 12 having an entry end 14 which extends into a first passage 16. Ports 18 are defined in this first passage and provide communication between this passage and a second passage 20. The second passage which is defined between interior wall 22 and outer wall 24 extends around the first passage and then downwardly toward the bottom of the tool. Hollow outlet means 26 provide for communication between the first passage and the exterior of the tool, while flexible closure ring 27 is adapted to be forced open when fluid is passed through the first passage to the exterior, and is adapted to be sealed shut when fluid passes upwardly around the exterior.

Disposed within the first passage is a movable means which consists of a tubular member 28 mounted on a rod 30, and a piston 32 also mounted on the rod 30. Passages 34 are formed in the tubular member whereby fluid can pass through this member and thereby exert pressure on the piston 32. A compression spring 36 normally urges the movable means upwardly to the position shown in FIGURE 1.

The rod 30 extends downwardly through a plate 40 which forms a bottom wall for the first passage 16. Attached to this rod beneath the plate 40 are a crow's feet type plate 38 and a magnet 42. The nature of the plate 38 permits free passage of fluid upwardly or downwardly depending on the type of circulation to be effected within the tool.

Disposed adjacent the lower end of the body portion 12 is a trap means composed of a plurality of pie-shaped members 44. As best shown in FIGURES 10 and 11, each of these members is pivotally connected to the trash catcher 45 by means of pin sockets 46. The catcher 45 is attached to the body portion by means of fasteners 47. A pair of axle members 48 is disposed within a cylindrical portion 50 defined by each of the pie-shaped members and a spring 52 is confined between these axle members to thereby hold these members in place.

A plurality of rods 54 are pivotally connected to each of the pie-shaped members at 56. These rods extend through openings defined in the plate 38 and cotter pins 58 prevent movement of the upper ends through the plate. Springs 60 are positioned around each of the rods 54 and are located between the plate 38 and the respective pie-shaped members. In the operation of the device, lowering of the plate 38 results in compression of the springs 60 to thereby force the pie-shaped members to pivot around their axles whereby they assume an open position as shown in FIGURE 2. Upward movement of the plate 38 provides for movement of the pie-shaped members to a horizontal position and consequent closure of the trap means while the plate engages the cotter pins. With this arrangement, the magnet 42 is moved inside the catcher 45 before the pie-shaped members close.

Additional rods 62 extend into bores 64 formed at the top of the passage 20. These rods extend downwardly through tubular members 66 and then beyond the plate 38. Closure members 68 are positioned at the upper end of these rods to fit into recess 70 formed at the top of the passage 20. These closure members therefore serve to block openings 72 which communicate the passage 20 with the exterior of the fishing tool.

Washer stops 74 are secured to the rods 62 and these stops are adapted to engage the top edges of the members 66 to limit downward movement of the rods 62. Catch washers 76 secured to the rods 62 are adapted to engage the plate 38 during downward movement of the plate whereby the closure members 68 will move away from the openings 72. A spring 75 located around the rods 62 and confined between the plate 38 and the washer stops 74 provides for closing movement of the members 68 when the plate 38 is in the raised position.

FIGURE 3 illustrates in detail the means provided for permitting removal of water during raising of the tool out of a well bore after completion of a retrieving operation. It will be noted that the fishing tool includes a cylinder 78 situated at the top of the first passage 16. A shear pin 80 is inserted in the neck 82 of the construction and the cylinder 78 rests on the end of this pin whereby the cylinder normally closes off openings 84 formed in the tool. When these openings are closed off, fluid is permitted to pass into the fishing tool without fluid passing through the openings 84. However, when a weight 86 in the form of a teardrop is dropped into the passage 16, the weight will engage the cylinder 78 and press it downwardly to shear off the end of the pin 80. This action will cause the cylinder to be positioned below the openings 84 and will close off the first passage 16 whereby fluid will pass around the exterior of the apparatus and will not pass into the interior thereof.

The above described arrangement is advantageously employed when the retrieving operation has been completed and after the magnet has been raised and the trap means closed. With the weight 86 in place, the fluid in the pipes extending to the fishing tool will pass to the exterior of the tool as the apparatus is raised. None of the fluid will pass into the interior of the apparatus and accordingly, there will be no tendency for materials retrieved by the tool to be washed out of the trap means.

FIGURE 4 illustrates a mechanism which provides for removal of the foreign materials retrieved in a given operation. This mechanism includes a fitting 88 which is to be threaded onto the entry end of the apparatus after removal of the tool from the well. A rotary arm 90 is threadably received by this fitting and the arm is connected to a threaded extension 92 which includes a foot 94 adapted to engage the tubular member 28. By turning the arm 90, the foot 94 will press the member 28 and the associated rod 30 downwardly whereby the plate 38 will effect opening of the trap means for discharge of foreign material therein. The magnet 42 is also moved to a position whereby material attached to the magnet can be removed.

In a typical use of the fishing tool of this invention, a fluid delivering pipe will be attached at the threaded portion 96 of the entry end of the apparatus. The tool will then be lowered into a well bore until it reaches a position near the bottom of the bore for retrieving of articles. During lowering of the fishing tool, a drilling member 98 attached at the lower end thereof is to be utilized for breaking through bridges and the like. It is desirable to provide for circulation of fluid about the drilling member and for this purpose, means are provided for passing fluid through the interior of the fishing tool into the area of drilling and then upwardly around the exterior of the fishing tool. This drilling circulation is effected by the application of fluid pressure to the piston 32 whereby the piston is lowered in opposition to the spring 36 by an amount sufficent to provide communication between the first and second passages through the ports 18. This circulation provides for movement of water through the second passage 20, around the drilling end of the tool and then upwardly about the exterior of the tool and about the fluid entry conduit.

When it is desired to achieve a retrieving operation, the fluid pressure is adapted to be increased to the extent that the piston 32 will be moved downwardly to expose the entry ends of outlet means 26. It will be noted that with the piston in the position shown in FIGURE 2, the tubular member 28 will serve to close off the ports 18 to thereby send all the fluid to the piston 32 and then outwardly through the outlet means 26. With this arrangement, the fluid passes around the exterior of the fishing tool and then upwardly through the tool until it passes out of the openings 72. It will be noted in this connection that this flushing circulation is carried out when the magnet 42 has been lowered and when the trap means are in the open position, and, therefore, the openings 72 will permit the passage of fluid.

In the course of the flushing circulation, the water or other fluid will force debris contained in the well bore into contact with the magnet 42 whereby magnetic articles will become attached to the magnet. Furthermore, non-magnetic particles will be flushed upwardly into the enclosure formed by the outer wall 24 and catcher 45, and, therefore, complete cleaning of the well bore can be effected.

When the tool has been held in place for a time sufficient to complete a cleaning operation, the water pressure is relieved whereby the plate 38 and associated components will move upwardly in response to the action of compression spring 36. The magnet 42 will move upwardly and then the pie-shaped members 44 of the trap means will move from a vertical to a horizontal position. With this arrangement, the trap means will cooperate to hold articles attached to the magnet. It will also be noted that non-magnetic materials flushed into the enclosure will be trapped therein since the trap means form a substantially complete closure for the bottom of the tool. To complete the cleaning operation, the weight 86 is dropped into contact with the cylinder 78 to clear the openings 84 so that fluid in the pipes leading to the tool will pass out of these openings as the tool is raised.

The tool of this invention is characterized by many obvious advantages. With regard to the operation of the tool, the use of fluid pressure for controlling the various circulation paths provides a means for automatically controlling the operation since pressure for one phase of the operation is changed over to a suitable pressure for a separate phase. The cooperative action of the trap means and the magnet has been found to provide a highly suitable combination for achieving virtually complete cleaning of a well bore. Furthermore, the combination of a magnet for retaining magnet materials and a trap means which completely closes off an enclosure for retaining other foreign materials provides for an extremely efficient operation.

It will be understood that various changes and modifications can be made in the above described finishing tool which provide the characteristics of this invention without departing from the spirit thereof particularly as defined in the following claims.

That which is claimed is:

1. A retrieving apparatus comprising a tubular body portion having an open lower end, a fluid entry defined in one end of said body portion, a first passage defined in said body portion and disposed in communication with said entry, a second passage defined by said body portion, and ports providing communication between said passages, outlet means communicating said first passage with the exterior of said body portion, movable means located within said first passage, means releasably closing said outlet means, retrieving means connected to said movable means, said movable means being shiftable between a first position freeing said ports for communicating the first and second passage and a second position blocking said ports, said retrieving means being located within a tubular body portion adjacent the lower open end for retrieving when said movable means is in said second position.

2. An apparatus in accordance with claim 1 wherein said retrieving means comprises a magnet.

3. An apparatus in accordance with claim 1 including means for attaching said body portion to a source of fluid, said movable means including a piston, and wherein said piston is adapted to assume said first position in response to application of fluid pressure and is adapted to assume said second position in response to an increase in fluid pressure.

4. An apparatus in accordance with claim 3 including a drilling member position at the lower end of said body portion, and wherein introduction of fluid to move said piston to said first position results in circulation of fluid through said ports and through said second passage to the lower end of said body portion and then upwardly around the exterior of said body portion to thereby provide for drilling circulation.

5. An apparatus in accordance with claim 3 wherein introduction of said fluid to move said piston to said second position results in circulation of fluid through said outlet means downwardly along the exterior of said body portion and then upwardly through said second passage, whereby a flushing action into said second passage is developed.

6. An apparatus in accordance with claim 5 including means for moving said piston out of said second position when said increased pressure is relieved, and further including trap means for closing off the bottom of said body portion and an operative connection between said piston and said trap means for actuation to close off the bottom of said body portion when said piston is in said first position and for opening the bottom of said body portion when said piston is moved from said first position toward said second position.

7. A retrieving apparatus adapted to be inserted into a well for removing articles at the bottom of the well, said apparatus comprising a tubular body portion having an open lower end, a fluid entry defined in one end of said body portion, a first passage defined in said body portion in communication with said entry, a second passage defined by said body portion, and ports providing communication between said passages, outlet means communicating said first passage with the exterior of said body portion, piston means located within said first passage and adapted to be reciprocally moved therein, means releasably closing said outlet means, spring means for urging said piston means upwardly toward said entry, retrieving means connected to said piston means, said piston means being shiftable between a first position freeing said ports for communicating the first and second passage and a second position blocking said ports, said retrieving means being located within a tubular body portion adjacent the lower open end.

8. An apparatus in accordance with claim 7 wherein said retrieving means comprises a magnet.

9. An apparatus in accordance with claim 7 including a rod for attaching said retrieving means and said piston means together, plate means secured to said rod, and trap means operatively connected to said plate means, said plate means operating to open said trap means when the plate means is moved downwardly by said rod, and operating to close said trap means when moved upwardly by said rod.

10. An apparatus in accordance with claim 9 wherein said retrieving means comprises a magnet and wherein said magnet is positioned below said trap means when the trap means are open, and wherein said trap means close when said magnet is moved upwardly above the trap means.

11. A retrieving apparatus adapted to be inserted into a well for removing articles at the bottom of the well, said apparatus comprising a tubular body portion having an open lower end, a fluid entry defined in one end of said body portion, a first passage defined by said body portion in communication with said entry, a second passage defined by said body portion and parts providing communication between said passages, outlet means communicating said first passage with the exterior of said body portion, movable means reciprocally mounted in said first passage and comprising a lower piston portion adapted to disrupt communication between said entry end and the exterior of said body portion when said movable means is in a first position means responsive to fluid pressure in said outlet means for opening and closing said outlet means, and an upper tubular portion adapted to close off said ports when said movable means is in a second position, means for urging said movable means upwardly away from said first and second positions, a rod extending downwardly from said movable means, a retrieving means connected at the lower end of said rod, a plate means secured to said rod above said retrieving means, trap means within the tubular body portion adjacent the lower open end operatively connected to said plate means, and an operative connection between said plate means and said trap means to open said trap means when the plate means is moved downwardly by said rod, and operating to close said trap means when moved upwardly by said rod.

12. An apparatus in accordance with claim 11 including means for attaching said body portion to a source of fluid, and wherein said movable means is adapted to assume said first position in response to application of fluid pressure which opposes the action of said urging means, and wherein said movable means is adapted to assume said second position in response to an increase in fluid pressure.

13. An apparatus in accordance with claim 12 including a drilling member positioned at the lower end of said body portion, and wherein introduction of fluid to move said movable means to said first position results in circulation of fluid through said ports and through said second passage to the lower end of said body portion and then upwardly around the exterior of said body portion to thereby provide for drilling circulation.

14. An apparatus in accordance with claim 12 wherein introduction of said fluid to move said movable means to said second position results in circulation of fluid through said outlet means downwardly along the exterior of said body portion and then upwardly through said second passage, whereby a flushing action into said second passage is developed and including a trap means located at the bottom of said body portion adapted to be opened when said movable means is in said second position to thereby expose the interior of said second passage, and wherein said retrieving means is positioned below said trap means when the trap means are open and wherein said trap means are adapted to close after said retrieving means is moved upwardly due to movement of the movable means away from said second position.

15. An apparatus in accordance with claim 14 wherein said trap means comprise a plurality of pie-shaped members which close off the lower end of said body portion when they are all moved to a horizontal position, rod means attached to each of said pie-shaped members, said rod means being engageable with said plate means whereby said pie-shaped members are adapted to assume a horizontal position when said plate means is moved upwardly.

16. An apparatus in accordance with claim 13 including flexible closure means disposed adjacent the exterior of said body portion and adapted to close off said outlet means in response to movement of fluid upwardly around the exterior of said body portion.

17. An apparatus in accordance with claim 12 wherein said fluid is transmitted through a pipe threaded onto the top of said body portion, apertures defined in said body portion adjacent the threaded portion thereof and extending to the exterior of said pipe, and means for opening said apertures and closing off communication between said pipe and said first passage when said apparatus is raised out of said well.

References Cited by the Examiner
UNITED STATES PATENTS

| | | | |
|---|---|---|---|
| 2,236,761 | 4/41 | Nichols | 294—86.15 |
| 2,700,567 | 1/55 | Fortenberry | 166—99 |
| 2,830,664 | 4/58 | Kirby | 166—99 |
| 2,915,127 | 12/59 | Abendroth | 166—99 |
| 3,067,821 | 12/62 | Crooks | 166—99 |

BENJAMIN HERSH, *Primary Examiner.*